US011445525B1

(12) United States Patent
Sawczuk et al.

(10) Patent No.: US 11,445,525 B1
(45) Date of Patent: Sep. 13, 2022

(54) NETWORK DATA TRAFFIC BUFFERING IN MOBILE NETWORKS

(71) Applicant: Juniper Networks, Inc., Sunnyvale, CA (US)

(72) Inventors: Jaroslaw J. Sawczuk, Rutland, MA (US); Nayan S. Patel, Bedford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/168,135

(22) Filed: Feb. 4, 2021

(51) Int. Cl.
*H04W 72/12* (2009.01)
*H04L 47/6275* (2022.01)
*H04L 47/52* (2022.01)
*H04W 40/02* (2009.01)

(52) U.S. Cl.
CPC ....... *H04W 72/1242* (2013.01); *H04L 47/522* (2013.01); *H04L 47/6275* (2013.01); *H04W 40/02* (2013.01)

(58) Field of Classification Search
None
See application file for complete search history.

(56) References Cited

U.S. PATENT DOCUMENTS

| 10,869,254 | B1* | 12/2020 | Huang | H04W 40/30 |
| 2012/0063464 | A1* | 3/2012 | Mehta | H04W 28/02 |
| | | | | 370/401 |
| 2013/0039287 | A1* | 2/2013 | Rayavarapu | H04W 72/042 |
| | | | | 370/329 |
| 2015/0312950 | A1* | 10/2015 | Cartmell | H04W 76/38 |
| | | | | 370/329 |
| 2018/0206275 | A1* | 7/2018 | Jain | H04W 40/02 |
| 2018/0317200 | A1* | 11/2018 | Kim | H04W 52/0212 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access" 3GPP TS 23.401 V16.9.0, Dec. 17, 2020, 440 pp.

(Continued)

*Primary Examiner* — Anh Vu H Ly
(74) *Attorney, Agent, or Firm* — Shumaker & Sieffert, P.A.

(57) ABSTRACT

Techniques are described for buffering data traffic destined for a mobile device when a data path to a base station for the mobile device is unavailable. For example, a network device comprises: a control unit comprising processing circuitry, wherein the control unit is configured to allocate, in response to determining that a data path from the network device to the base station for a mobile device is unavailable, a hardware queue of a packet processor of the network device to the data path; and a forwarding component with access to the hardware queue, wherein the forwarding component is configured to store data traffic for the mobile device to the allocated hardware queue, wherein the control unit is configured to, in response determining that the data path is available, configure the forwarding component to output the data traffic from the allocated hardware queue to the base station along the data path.

18 Claims, 4 Drawing Sheets

(56) References Cited

OTHER PUBLICATIONS

"3rd Generation Partnership Project; Technical Specification Group Services and System Aspects; System architecture for the 5G System (5GS); Stage 2" 3GPP TS 23.501 V16.7.0, Dec. 17, 2020, 307 pp.

"3rd Generation Partnership Project; Technical Specification Group Services and System Aspects; Architecture enhancements for control and user plane separation of EPC nodes; Stage 2" 3GPP TS 23.214 V14.0.0, Sep. 2016, 65 pp.

"3rd Generation Partnership Project; Technical Specification Group Radio Access Network; NG-RAN; Architecture description" 3GPP TS 38.401 V15.0.0, Dec. 2017, 23 pp.

\* cited by examiner

NETWORK DATA TRAFFIC BUFFERING IN MOBILE NETWORKS

TECHNICAL FIELD

The disclosure relates to computer networks and, more particularly, to buffering of network traffic in mobile networks.

BACKGROUND

A cellular radio access network is a collection of cells that each includes at least one base station capable of transmitting and relaying signals to subscribers' wireless devices ("subscriber devices"). A "cell" generally denotes a distinct area of a mobile network that utilizes a particular frequency or range of frequencies for transmission of data. A typical base station is a tower to which are affixed a number of antennas that transmit and receive the data over the particular frequency. Subscriber devices, such as cellular or mobile phones, smart phones, camera phones, personal digital assistants (PDAs), and laptop computers, may initiate or otherwise transmit a signal at the designated frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from subscriber devices into Internet protocol (IP) packets for transmission within packet-based networks, and vice-versa. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS) architecture, an evolution of UMTS referred to as Long Term Evolution (LTE), a further evolution known as 5G, mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

A typical mobile service provider network, or mobile network, includes a core packet-switched network (the "mobile core"), a transport/aggregation network, and one or more radio access networks. The mobile core establishes logical connections, known as bearers, among the many network devices that operate as support nodes on a path between a subscriber device, attached to one of the radio access networks, and a packet data network (PDN). The network devices utilize the bearers to transport packet-based subscriber traffic exchanged between the subscriber device and the PDN, which may include, for example, the Internet, an enterprise intranet, a layer 3 VPN, and a service provider's private network. Various PDNs provide a variety of packet-based data services to subscriber devices to enable the subscriber devices to exchange service data with application or other servers of the PDNs. The increasing number of services available to an increasing number of mobile subscriber devices pressures available mobile network resources.

SUMMARY

In general, techniques are described for buffering data traffic destined for a mobile device when a data path to a base station for the mobile device is not available. For example, a network device of the mobile network, such as a Serving Gateway (of an 4G/LTE architecture) or User Plane Function device (of a 5G architecture) logically located between a radio access network for the mobile network and a packet data network, may include hardware queues typically used for scheduling packets for packet transmission. When the data path to the base station for a particular mobile device is not available (or will become unavailable) for packet transmission, such as during data path initialization or when the mobile device enters power saving or idle mode, one of the hardware queues may be allocated to instead buffer data traffic that is received at the network device for transmission on the data path. When the data path becomes available for packet transmission, the network device schedules the allocated hardware queue and outputs any packets buffered by the allocated hardware queue for transmission on the data path to the base station. The data path may include, for instance, a data bearer such as a General Packet Radio Service (GPRS) Tunneling Protocol (GTP) tunnel.

In some examples, a scheduler of the network device may disable scheduling (e.g., by applying backpressure or setting NULL scheduling priority) for the allocated hardware queue such that the allocated hardware queue may be used by the network device to buffer received data traffic until scheduling is reenabled, where the received data traffic is destined for output to the mobile device on the particular data path to the base station for the mobile device. In some examples, the network device may, statically or dynamically (e.g., in response to receiving a first packet for transmission on the data path when the data path is not available), assign the allocated hardware queue to the particular data bearer of the data path to buffer the data traffic destined for output to the mobile device on the particular data path.

The techniques described in this disclosure may provide one or more technical advantages. For example, by allocating a hardware queue to buffer data traffic destined for output to a mobile device on a particular data path to a base station for the mobile device, a network device may repurpose one of a number of existing hardware queues that are typically used for traffic scheduling and instead use the allocated hardware queue for a particular data bearer. Because of the large number of data bearers to base stations typically managed by a mobile core network device, and because of the dynamic nature of such data bearers, the simple correspondence created by specially allocating a hardware queue to a particular data path to a base station (e.g., to a particular data bearer) may significantly reduce management and administration of buffering of downlink data traffic that is required by the mobile network standards. This may reduce the number of central processing unit (CPU) cycles devoted to buffering and thereby improve network device processing efficiencies. In addition, the techniques may avoid the network device having to rely on control plane processes to buffer the data traffic, which suffers from lower performance, for data traffic to be buffered using the control plane requires copying the packet from the hardware-based network processor to main memory and then again copying the packet back into the network processor for eventual forwarding. Temporarily buffering such packets using hardware queues of the network processor may avoid this.

In one example, a method may include, in response to determining, by a network device of a mobile network, a data path from the network device to a base station for a mobile device is not available, allocating a hardware queue of a packet processor of the network device to the data path;

storing, by the network device, data traffic for the mobile device to the allocated hardware queue; and in response to determining, by the network device, the data path is available, outputting the data traffic from the allocated hardware queue to the base station along the data path.

In another example, a network device may include a control unit comprising processing circuitry, wherein the control unit is configured to allocate, in response to a determination that a data path from the network device to the base station for a mobile device is not available, a hardware queue of a packet processor of the network device to the data path; and a forwarding component with access to the hardware queue, wherein the forwarding component is configured to store data traffic for the mobile device to the allocated hardware queue, wherein the control unit is configured to, in response a determination that the data path is available, configure the forwarding component to output the data traffic from the allocated hardware queue to the base station along the data path.

In another example, a non-transitory computer-readable storage medium comprising instructions, that when executed by processing circuitry of a network device of a mobile network, cause the processing circuitry to: allocate, in response to a determination that a data path from the network device to a base station for a mobile device is not available, a hardware queue of a packet processor of the network device to the data path; store data traffic for the mobile device to the allocated hardware queue; and output, in response to a determination that the data path is available, the data traffic from the allocated hardware queue to the base station along the data path.

The details of one or more examples of the techniques are set forth in the accompanying drawings and the description below. Other features, objects, and advantages of the techniques will be apparent from the description and drawings, and from the claims.

DETAILED DESCRIPTION

Figure 1:
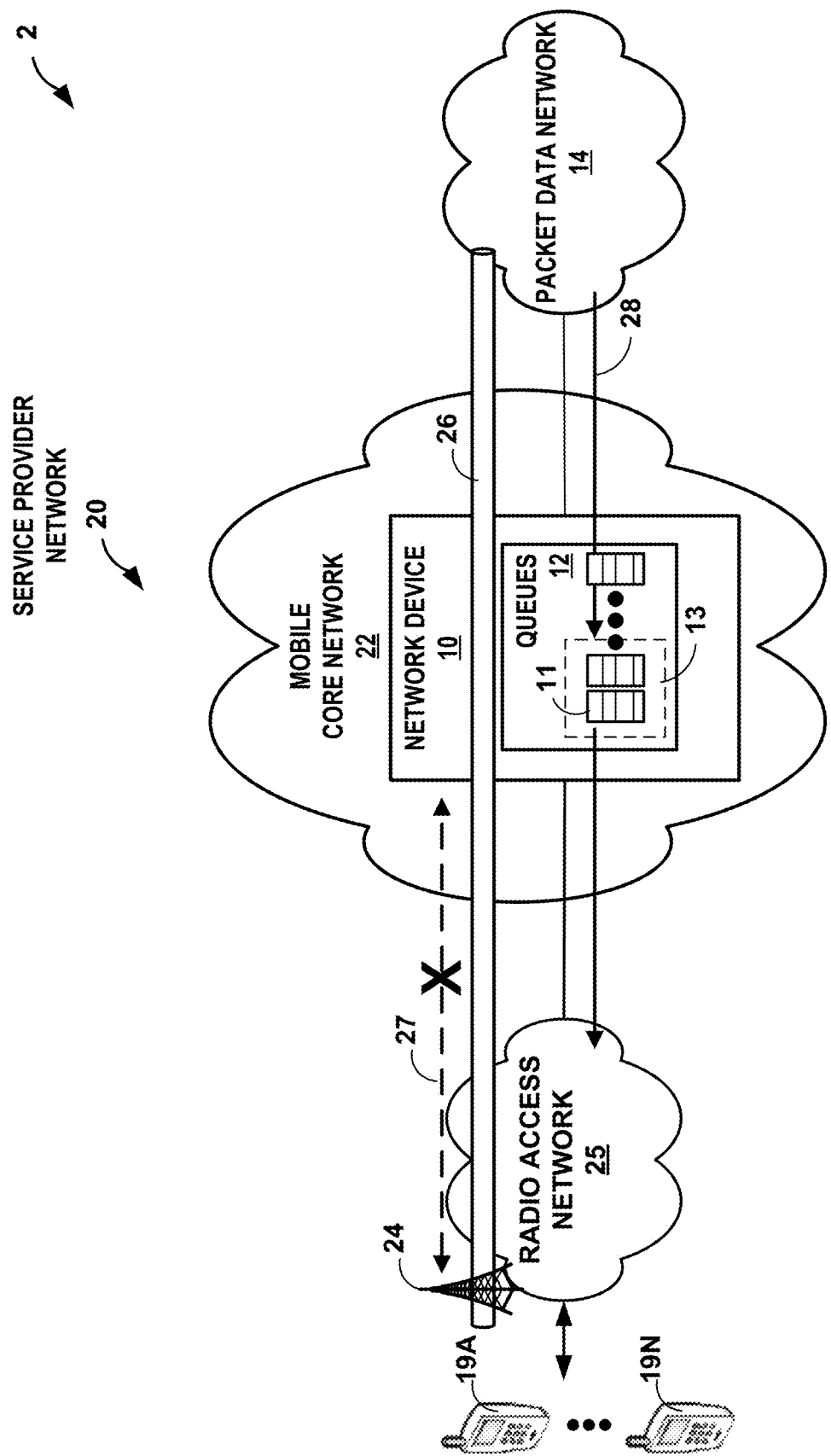
FIG. 1 is a block diagram illustrating an example system that provides buffering of data traffic destined for a mobile device when a data path to a base station for the mobile device is not available, in accordance with techniques described herein.

FIG. 1 is a block diagram illustrating an example network system 2 that provides buffering of data traffic destined for a mobile device when a data path to a base station for the mobile device is not available, in accordance with the techniques described in this disclosure. As shown in the example of FIG. 1, network system 2 includes a mobile service provider network 20 (otherwise referred to herein as "mobile network 20") that provides mobile devices 19A-19N with connectivity to packet data network (PDN) 14 to access, e.g., services (not shown) provided by PDN 14, such as a Voice over IP (VoIP) service, an Internet data service, cloud service, or a video service (including a video service referred to IP television or IPTV) and other services.

Each of mobile devices 19 may comprise, for example, a mobile telephone, a laptop or desktop computer having, e.g., mobile connectivity, a wireless-capable netbook, a video game device, a pager, a smart phone, a personal data assistant (PDA), Internet of Things (IoT) devices or other mobile devices. Each of mobile devices 19 may run one or more applications, such as mobile calls, video games, video-on-demand, videoconferencing, and email, among others. Mobile devices 19 may be alternatively referred to as User Equipment (UEs), subscriber devices, or mobile subscriber devices.

Mobile service provider network 20 may also include or otherwise connect to radio access network 25 in which one or more base stations (e.g., base station 24) communicate via radio signals with mobile devices 19. Radio access network 25 is a transport network that enables base stations to exchange packetized data with a packet data network, e.g., packet data network 14, ultimately to access one or more services provided by the packet data network. Radio access network 25 may comprise, for example, a GSM Radio Access Network (GRAN), a WiMAX radio access network, a UMTS Radio Access Network (UTRAN), an evolution of a UTRAN known as an E-UTRAN, a 5G RAN, or other Radio Access Network architecture. In the illustrated example, radio access network 25 includes base station 24. Base station 24 may represent a NodeB, eNodeB, and/or gNodeB, for example, and/or another type of cellular base station.

Packet data network 14 supports one or more packet-based services that are available for request and use by mobile devices 19. As examples, packet data network 14 may provide, for example, bulk data delivery, voice over Internet protocol (VoIP), Internet protocol television (IPTV), Short Messaging Service (SMS), Wireless Application Protocol (WAP) service, video streaming, IoT application services, and/or customer-specific application services.

Packet data network 14 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates mobile service provider network 20, an enterprise IP network, or some combination thereof. In various examples, packet data network 14 is connected to a public WAN, the Internet, or to other networks. Packet data network 14 executes one or more packet data protocols (PDPs), such as IP (IPv4 and/or IPv6), X.25 or Point-to-Point Protocol (PPP), to enable packet transport for services. Packet data network 14 may include a variety of network devices (not shown), such as routers, switches, servers, or other devices.

Mobile service provider network 20 includes mobile core network 22 and radio access network (RAN) 25. Mobile devices 19 communicate using wireless links to a base station, e.g., base station 24, of radio access network 25 to access mobile service provider network 20. Mobile service provider network 20 may, in some examples, include multiple radio access networks coupled to mobile core network 22.

Mobile core network 22 and RAN 25 may communicate over a backhaul (or "transport") network (not shown) that includes land-based transmission lines, frequently leased by a service provider for mobile service provider network, to transport subscriber data and control traffic between RAN 25 and mobile core network 22. The backhaul network may include network devices such as aggregation devices and routers.

Mobile core network 22 provides session management, mobility management, and transport services between RAN 25 and PDN 14 to support access, by mobile devices 19, to services provided by PDN 14. Mobile core network 22 may represent, for instance, a general packet radio service (GPRS) core packet-switched network, an IP-based mobile multimedia core network, an Evolved Packet Core (EPC), or 5G core. Mobile core network 22 includes supporting nodes including network device 10 that provides firewall, billing, deep-packet inspection (DPI), and other services for subscriber data traversing the mobile core network.

In some examples, mobile service provider network 20 may represent a 4G/Long Term Evolution (LTE) architecture. In a 4G/LTE architecture, mobile core network 22 may include a Mobility Management Entity (MME) (not shown) for paging user equipment (e.g., mobile devices 19), bearer activation or deactivation, selecting a Serving Gateway (SGW) for the user equipment during initialization of a session and/or during base station handover. Mobile core network 22 may include network device 10 that may represent the SGW that provides mobility support by serving as the local mobility anchor for base station handover and inter-network mobility. Mobile core network 22 of an LTE architecture may also include a Packet Data Network Gateway (PGW) that provides services for subscriber data traffic traversing mobile core network 22. The PGW may interface between mobile core network 22 and packet data network 14. Network device 10 may, in some examples, include SGW or a combination of SGW and PGW, referred to as a "System Architecture Evolution Gateway (SAEGW)."

In an LTE architecture, a traffic bearer, e.g., traffic bearer 26, is established to enable data traffic to be forwarded between mobile device 19A and packet data network 14. In this example, traffic bearer 26 typically includes one or more data bearers, such as a General Packet Radio Service (GPRS) Tunneling Protocol (GTP) tunnel. A GTP tunnel is typically assigned a GTP-U tunnel IP address and tunnel endpoint ID (TEID). In this example, traffic bearer 26 includes data path 27 that may represent an S1 GTP tunnel (otherwise referred to as "S1 bearer") between base station 24 (e.g., eNodeB) and SGW of network device 10. There may be two S1 bearers, one for each direction. Traffic bearer 26 also includes a radio bearer between a given mobile device, e.g., mobile device 19A and base station 24 and an S5 GTP tunnel (otherwise referred to as "S5 bearer") between an SGW and a PGW. Network device 10 may represent the SGW. The combination of the radio bearer, S1 bearer, and S5 bearer that form traffic bearer 26 may be referred to as an Evolved Packet System (EPS) bearer.

As an example packet flow within an LTE architecture, a PGW may receive a packet from packet data network 14 that is destined for output to mobile device 19A on traffic bearer 26. The PGW may encapsulate the packet with a GTP tunnel header for a given GTP tunnel (e.g., S5 GTP tunnel) to tunnel the packet to the SGW (e.g., network device 10). The GTP tunnel header may include the source tunnel endpoint address (e.g., IP address of PGW), destination tunnel endpoint address (e.g., IP address of SGW), and the tunnel endpoint ID associated with S5 GTP tunnel. In response to receiving the packet, the SGW of network device 10 may modify the GTP tunnel header to include the source tunnel endpoint address (e.g., IP address of SGW), destination tunnel endpoint address (e.g., IP address of base station 24), and the tunnel endpoint ID associated with data path 27 (e.g., S1 GTP tunnel). Base station 24 then receives the packet and forwards the packet to mobile device 19A on a radio bearer. Additional examples of a data path for 4G/LTE networks is described in 3GPP 23.401, Version 16.9.0, Dec. 17, 2020, the entire contents of which is incorporated by reference herein. Data path 27 may include a data bearer from network device 10 (an SGW in this 4G/LTE example) to base station 24 for mobile device 19A.

In some examples, mobile service provider network 20 may represent a 5G architecture. In a 5G architecture, mobile core network 22 may include an Access and Mobility Management Function (AMF) (not shown) that provides connection and mobility management and a Session Management Function (SMF) (also not shown) for creating, updating, and removing Protocol Data Unit (PDU) sessions and managing session context with a User Plane Function (UPF) that provides an interconnect point between the mobile core network 22 and packet data network 14. In the example of FIG. 1, network device 10 that may represent the UPF. In a 5G architecture, traffic bearer 26 is established to enable data traffic to be forwarded between mobile device 19A and packet data network 14. Traffic bearer 26 includes data path 27 that may represent a GTP tunnel (otherwise referred to as "N3 GTP tunnel") between the network device 10 (e.g., UPF) and the base station 24 (e.g., gNodeB). Traffic bearer 26 also includes a radio bearer between a given mobile device, e.g., mobile device 19A and base station 24. Data path 27 may represent a data path from network device 10 (a UPF in this 5G example) to base station 24 for mobile device 19A.

As an example packet flow within an 5G architecture, a UPF of network device 10 may receive a packet from packet data network 14 that is destined for output to mobile device 19A on traffic bearer 26. The UPF may encapsulate the packet with a GTP tunnel header for data path 27 (e.g., N3 GTP tunnel) to tunnel the packet to base station 24. Base station 24 then receives the packet and forwards the packet to mobile device 19A. Additional examples of the data path for 5G networks is described in 3GPP TS 23.501, Version 16.7.0, Dec. 17, 2020, the entire contents of which is incorporated by reference herein.

When data path 27 to base station 24 for mobile device 19A is not available (or will become unavailable) for packet transmission, such as during data path initialization or when mobile device 19A enters power saving or idle mode, the network device 10 is unable to deliver downlink data traffic destined for mobile device 19A because the data path to base station 24 is not available (e.g., data path 27 is not established or released). Ordinarily, when a network device in the mobile core network receives downlink data traffic for the mobile device and the data path is unavailable, the network device typically relies on control plane processes to buffer the data traffic. For example, the network device typically sends the data traffic to a general purpose processor (e.g., Central Processing Unit (CPU)) to buffer the data traffic in main memory until the data path becomes available. However, buffering data traffic using a general purpose processor and main memory suffers from lower performance for data traffic to be buffered using the control plane requires copying the packet from the hardware-based network processor to main memory and then again copying the packet back into the network processor for eventual forwarding.

As further described below, network device 10 comprises a forwarding component including at least one packet processor that processes packets by performing a series of operations on each packet over respective internal packet forwarding paths as the packets traverse the internal architecture of network device 10. For example, network device 10 may include configurable hardware chips (e.g., a chipset) that define the operations to be performed by packets received by the forwarding component, such as queueing, buffering, interfacing, and lookup/packet processing. In the example of FIG. 1, network device 10 comprises a forwarding component including a chipset providing hardware queues 12 (or simply "queues 12").

In some examples, network device 10 may typically use queues 12 for scheduling packets for packet transmission. For example, network device 10 may include a scheduler (not shown) that defines properties of queues 12, such as an amount of interface bandwidth assigned to the queue, size of the memory buffer allocated for storing packets, the priority of the queue, and profiles (e.g., random early detection (RED) drop profiles) associated with the queue for packet transmission. In this way, the scheduler may control packet transmission using queues 12.

In accordance with the techniques of the disclosure, network device 10 may repurpose one of a number of existing hardware queues 12 that are typically used for traffic scheduling and instead use the hardware queue for buffering data traffic of a particular data path from network device 10 to base station 24 for mobile devices 19 is unavailable.

For example, one or more queues are set aside from hardware queues 12 for buffering data traffic (referred to herein as "buffering queues 13"). When network device 10 determines that data path 27, is unavailable, such as during data path initialization or when mobile device 19A enters power saving or idle mode, network device 10 may allocate a hardware queue 11 (referred to as "allocated hardware queue 11") from buffering queues 13 to buffer data traffic destined for output to mobile device 19A on data path 27.

As one example, network device 10 may determine that data path 27 is unavailable or will become unavailable, e.g., by receiving a control message indicating mobile device 19A is entering idle or power saving mode. For instance, in an LTE architecture, the MME may determine mobile device 19A is in idle or power saving mode (e.g., by pinging mobile device 19A or receiving a message from mobile device 19A that mobile device 19A is entering into idle or power saving mode), and in response, sends a control message to SGW of network device 10 to indicate mobile device 19A is in idle or power saving mode. Similarly, in a 5G architecture, the AMF may determine mobile device 19A is in idle or power saving mode (e.g., by pinging mobile device 19A or receiving a message from mobile device 19A that mobile device 19A is entering into idle or power saving mode), and in response, sends a control message to SMF, which in turn sends the control message to UPF of network device 10 to indicate mobile device 19A is in idle or power saving mode.

To allocate one or more hardware queues for buffering, for example, network device 10 may disable scheduling for the hardware queues. For example, network device 10 may disable scheduling to allocated hardware queue 11 by applying backpressure to allocated hardware queue 11, which throttles the dequeue rate of allocated hardware queue 11. As another example, network device 10 may disable scheduling by setting NULL scheduling priority for allocated hardware queue 11. In this way, data traffic stored in allocated hardware queue 11 is not released until scheduling for the allocated hardware queue 1 is enabled (e.g., by removing backpressure or setting the scheduling priority to not NULL). In some examples, network device 10 may disable scheduling to allocated hardware queue 11 in response to determining data path 27 is unavailable. In some examples, network device 10 may disable scheduling to allocated hardware queue 11 and/or buffering queues 13 during the initialization of network device 10.

In some examples, an administrator may statically assign the allocated hardware queue 11 to data path 27 of traffic bearer 26. In some examples, network device 10 may dynamically assign data path 27 to allocated hardware queue 11, such as when network device 10 receives an initial packet for transmission on traffic bearer 26 and data path 27 is not available.

As one example, network device 10 may receive packet 28 that is destined for output to mobile device 19A on data path 27 and stores packet 28 in allocated hardware queue 11. Network device 10 may also store subsequent packets destined for mobile device 19A in allocated hardware queue 11 until data path 27 becomes available. In response to determining that data path 27 is available, network device 10 may stop buffering data traffic (e.g., by enabling scheduling for the allocated hardware queue 11), release the data traffic that is buffered in allocated hardware queue 11, and send the data traffic to base station 24 of mobile device 19A along data path 27. In some examples, network device 10 may determine that data path 27 is available by receiving an indication that mobile device 19A is no longer in idle or power saving mode. In some examples, network device 10 may determine data path 27 is available by establishing a data bearer between network device 10 and base station 24.

Figure 2:
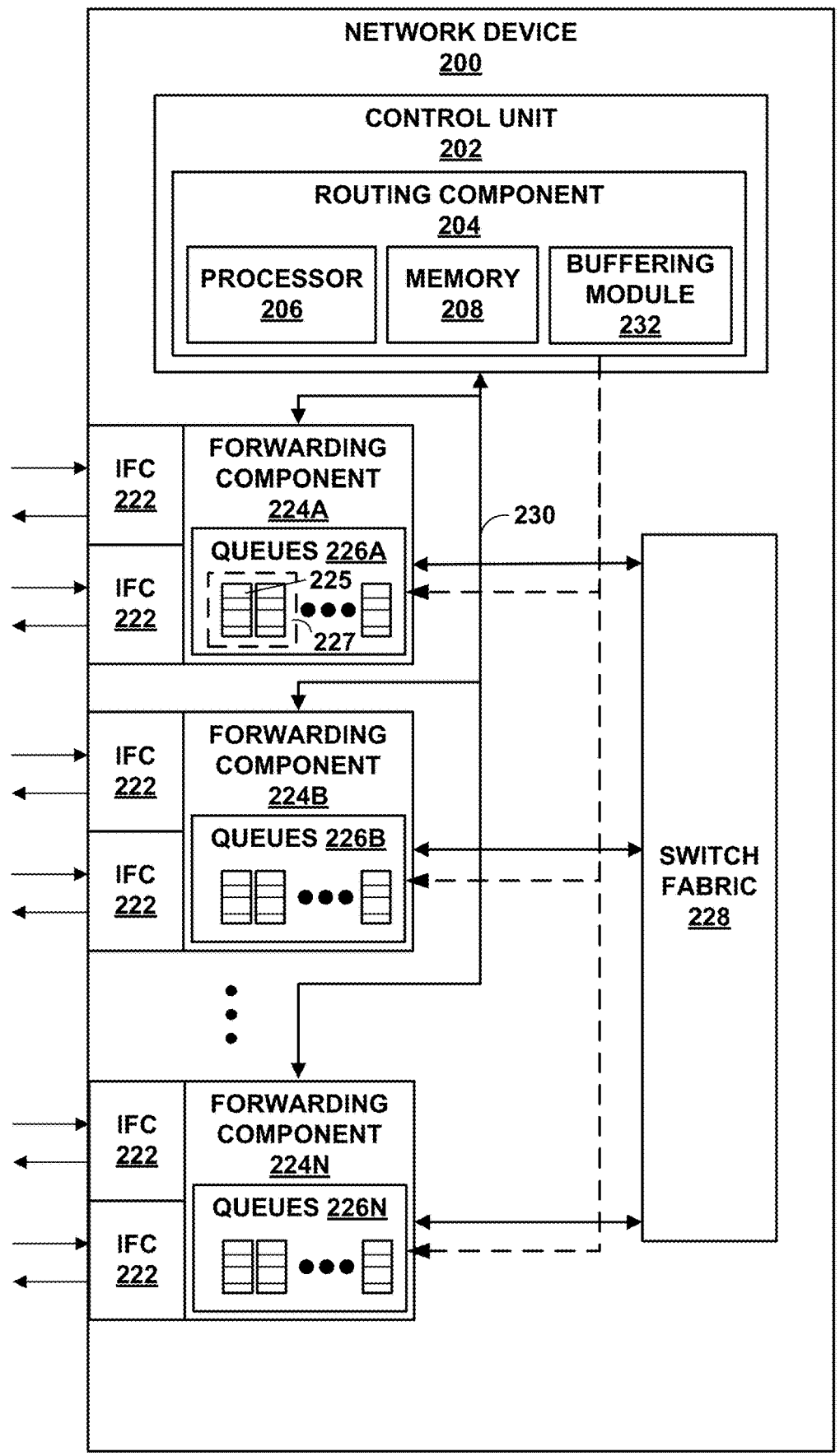
FIG. 2 is a block diagram illustrating an example network device of a mobile network that provides buffering of data traffic destined for a mobile device when a data path to a base station for the mobile device is not available, in accordance with the techniques described in this disclosure.

FIG. 2 is a block diagram illustrating an example network device 200 of a mobile network that provides buffering of data traffic destined for a mobile device when a data path to a base station for the mobile device is not available, in accordance with the techniques described in this disclosure. Network device 200 may represent an example implementation of network device 10 of FIG. 1, for example, but may represent a router, switch, or any other network device of the mobile network for forwarding traffic. For ease of illustration, network device 200 is described with respect to network device 10 of FIG. 1.

In this example, network device 200 includes a control unit 202 that provides control plane functionality for network device 200. Control unit 202 may be distributed among multiple entities, such as one or more routing units and one or more service cards insertable into network device 200. In such instances, network device 200 may therefore have multiple control planes.

Control unit 202 may include a routing component 204 may provide control plane functions, storing and maintaining routing information (e.g., in a routing information base (RIB)) reflective of the current topology of the network in which network device 200 resides, and executing routing protocols to communicate with peer routing devices. Network device 200 also includes one or more forwarding components, e.g., forwarding components 224A-224N ("forwarding components 224") and a switch fabric 228, that together provide a forwarding plane for forwarding and otherwise processing data traffic.

In some examples, network device 200 may represent an Evolved Packet Core (EPC) or 5G core node. For example, network device 200 may be configured in accordance with the Control and User Plane Separation (CUPS) architecture. In some examples, network device 200 may represent an EPC node for a 4G/LTE network, where routing component 204 may include SGW-C (and in some examples PGW-C) that may execute control protocols, such as GTP-C, to send and receive signaling messages in the control plane between network device 200 and a base station. In these examples, forwarding components 224 may include SGW-U (and in some examples PGW-U) that may execute user plane (i.e., data plane) protocols, such as GTP-U, to send and receive packet data units in the data plane.

In some examples, network device 200 may represent a 5G core node for a 5G network, where routing component 204 may include UPF-C that may execute control protocols, such as Packet Forwarding Control Protocol (PFCP) to send and receive signaling messages between an SMF and the UPF. In these examples, forwarding components 224 may include UPF-U that may execute user plane protocols, such as GTP-U, to send and receive packet data units in the data plane between network device 200 and the base station. Some or all control plane functions may be performed by separate computing devices. Additional examples of control plane functions and user plane functions for 4G/LTE networks are described in 3GPP TS 23.401, TS 23.214, Release 14, the entire contents of which is incorporated by reference herein in its entirety. Additional examples of control plane functions and user plane functions for 5G networks are described in 3GPP TS 23.501, TS 38.401, Release 15, the entire contents of which is incorporated by reference herein in its entirety.

Control unit 202 is connected to each of forwarding components 224 by internal communication link 230. Internal communication link 230 may comprise an Ethernet connection, for instance. Routing component 204 may execute daemons (as further shown in FIG. 3), e.g., user-level processes that may run network management software, to execute routing protocols to communicate with peer routing devices, execute configuration commands received from an administrator, maintain and update routing information, manage flow processing, and/or create forwarding information for installation to forwarding components 224, among other functions.

Control unit 202 may include one or more processors (e.g., processor 206) that execute software instructions, such as those used to define a software or computer program, stored to a computer-readable storage medium (also not shown in FIG. 2), such as non-transitory computer-readable mediums including a storage device (e.g., a disk drive, or an optical drive) and/or a memory (e.g., memory 208) such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 202 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Forwarding components 224 receive and send data packets via interfaces of interface cards 222 ("IFCs 222") each associated with a respective one of forwarding components 224. Each of forwarding components 224 and its associated one of IFCs 222 may reside on a separate line card (not shown) for network device 200. Example line cards include flexible programmable integrated circuit (PIC) concentrators (FPCs), dense port concentrators (DPCs), and modular port concentrators (MPCs). Each of IFCs 222 may include interfaces for various combinations of layer two (L2) technologies, including Ethernet, Gigabit Ethernet (GigE), and Synchronous Optical Networking (SONET) interfaces. In various aspects, each of forwarding components 224 may comprise more or fewer IFCs. Switch fabric 228 provides a high-speed interconnect for forwarding incoming data packets to the selected one of forwarding components 224 for output over a network.

In some examples, switch fabric 228 may be a distributed, multi-stage switch fabric architecture, in which network packets traverse multiple stages of the switch fabric located in distributed forwarding components of the router to travel from an ingress point of the switch fabric to an egress point of the switch fabric. As one example, switch fabric 228 may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may be viewed as an independent portion of the multi-stage Clos switch fabric, where each plane provides switching redundancy.

Forwarding components 224 process packets by performing a series of operations on each packet over respective internal packet processing paths as the packets traverse the internal architecture of network device 200. Operations may be performed, for example, on each packet by any of a corresponding ingress interface, an ingress forwarding component 224, an egress forwarding component 224, an egress interface or other components of network device 200 to which the packet is directed prior, such as one or more service cards. The result of packet processing determines the way a packet is forwarded or otherwise processed by forwarding components 224 from its input interface on one of IFCs 222 to its output interface on one of IFCs 222. In the example of FIG. 2, IFCs 222 of forwarding component 224A may interface with a packet data network (e.g., packet data network 14 of FIG. 1), radio access network devices, and or transport/aggregation network devices on a data path to base stations of radio access networks.

As further described in FIG. 3 below, forwarding components 224 may include one or more packet processors that process packets by performing a series of operations on each packet over respective internal packet forwarding paths as the packets traverse the internal architecture of network device 200. Forwarding components 224 may each include configurable hardware chips (e.g., a chipset) that define the operations to be performed by packets received by forwarding components 224. Each chipset may in some examples represent a "packet forwarding engine" (PFE). Each chipset may include different chips each having a specialized function, such as queueing, buffering, interfacing, and lookup/packet processing. Each of the chips may represent ASIC-based, FPGA-based, or other programmable hardware logic. Each forwarding component 224 may include one or more packet processors. In the example of FIG. 2, forwarding components 224 may include hardware queues 226A-226N (collectively, "queues 226"), respectively.

In accordance with the techniques described in this disclosure, one or more hardware queues are repurposed for buffering data traffic of a particular data path (e.g., data path 27 of FIG. 1) when the data path is not available. These repurposed hardware queues are illustrated in FIG. 2 as buffering queues 227.

When network device 200 determines that a data path (e.g., data path 27 of FIG. 1) is unavailable, such as during data path initialization or when mobile device 19A enters power saving or idle mode, network device 200 may allocate a hardware queue 225 (referred to as "allocated hardware queue 225") from buffering queues 227 to buffer data traffic for data path 27.

Network device 200 may disable scheduling to enable allocated hardware queue 225 and/or buffering queues 227 to buffer data traffic. For example, network device 200 may disable scheduling by applying backpressure or setting NULL scheduling priority for allocated hardware queue 225 and/or buffering queues 227. As one example, a network administrator may use a user interface (UI) to interact with network device 200 to disable scheduling for buffering queues 227. The user interface may be, for example, a command line interface (CLI) or a graphical user interface (GUI). In some instances, network device 200 receives input automatically generated by scripts or other software agents to set aside one or more of buffering queues 227 so as to avoid manual configuration by the administrator.

Network device 200 may include a buffering module 232 to control buffering by forwarding components 224. For example, buffering module 232 may determine whether a traffic bearer (e.g., traffic bearer 26 of FIG. 1) that connects mobile device 19A to packet data network 14 is unavailable or will be unavailable. For instance, network device 200 may receive an indication that mobile device 19A is entering power saving or idle mode, which causes data path 27 of traffic bearer 26 to be unavailable. In response, buffering module 232 may instruct forwarding component 224A to buffer data traffic that is received from packet data network 14 via IFC 222 and is destined for output to mobile device 19A on traffic bearer 26.

In some examples, an administrator may use the user interface to statically assign the allocated hardware queue 225 to data path 27 of traffic bearer 26. In some examples, network device 200 may dynamically assign data path 27 to allocated hardware queue 225, such as when network device 200 receives a first packet for transmission on traffic bearer 26 and data path 27 is not available.

Network device 200 may receive data traffic from packet data network 14 via one of IFCs 222 of forwarding component 224A and determine that the data traffic is destined for output to mobile device 19A on traffic bearer 26. In response, network device 200 may store the data traffic in allocated hardware queue 225 until data path 27 becomes available. Network device 200 may also store subsequent data traffic destined for mobile device 19A in allocated hardware queue 225.

In response to determining that data path 27 is available, network device 200 may stop buffering data traffic (e.g., by enabling scheduling for the allocated hardware queue 225), release the data traffic that is buffered in allocated hardware queue 225, and send the data traffic to base station 24 of mobile device 19A along data path 27. For example, network device 200 may determine data path 27 is available by receiving an indication that mobile device 19A is no longer in idle or power saving mode and/or by establishing a data bearer between network device 200 and base station 24. In response, buffering module 232 may instruct forwarding component 224A to release the data traffic buffered in allocated hardware queue 225 and forward the data traffic along the data path 27 to base station 24. As one example, buffering module 232 may configure a scheduler to enable scheduling for the allocated hardware queue 225, e.g., by removing backpressure or setting the scheduling priority to not NULL, to disable any further buffering. Forwarding component 224A releases the data traffic stored in allocated hardware queue 225 and forwards the data traffic via one of IFCs 222 of a forwarding component 224 that is connected to base station 24 for mobile device 19A.

Figure 3:
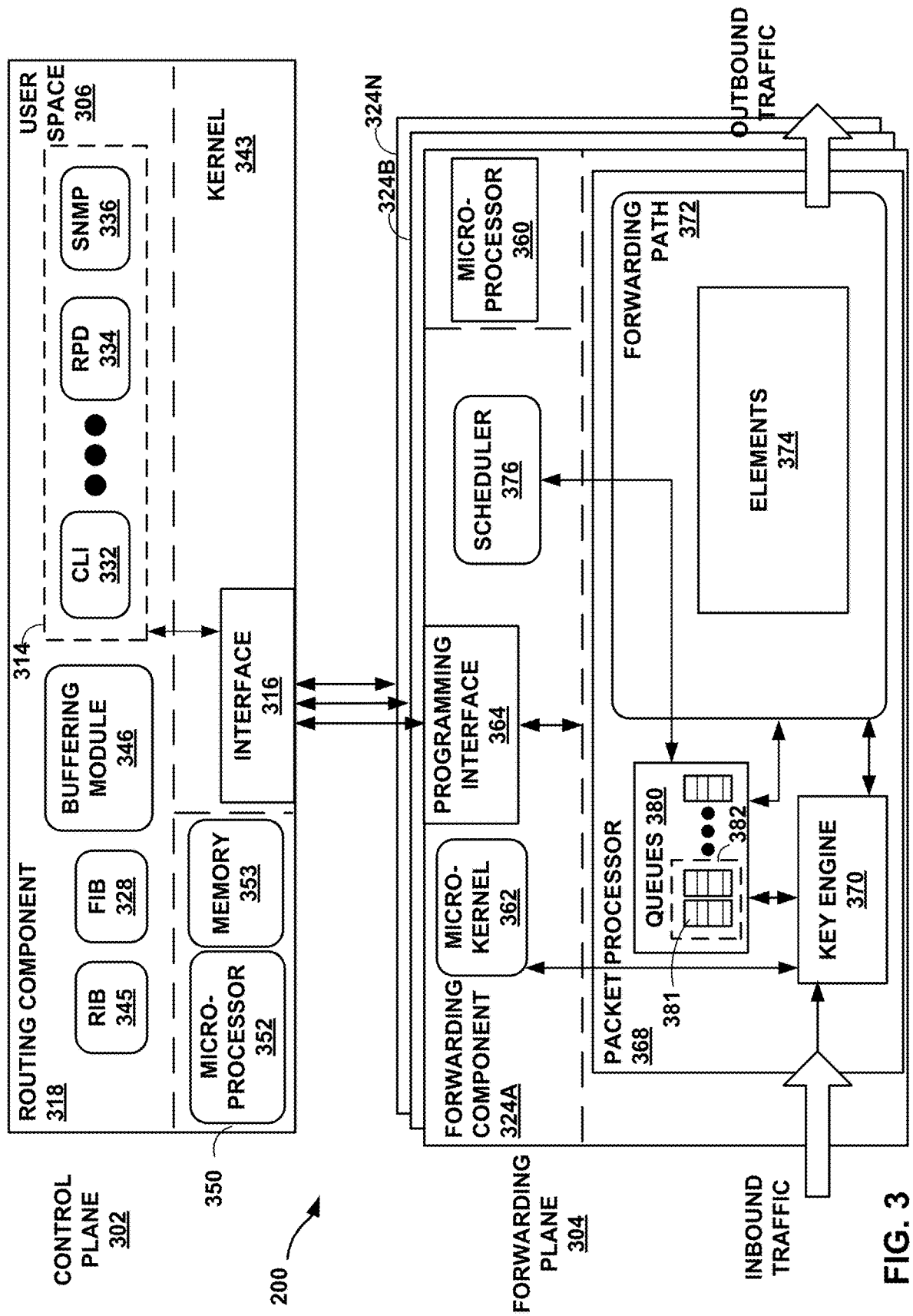
FIG. 3 is a block diagram illustrating example implementation of a routing component and forwarding components of the network device in further detail.

FIG. 3 is a block diagram illustrating example implementation of a routing component and forwarding components of the network device in further detail. Routing component 318 may represent an example implementation of routing component 204 of FIG. 2. Forwarding components 324A-324N may represent an example implementation of forwarding components 204 of FIG. 2.

In this example, routing component 318 provides a control plane 302 operating environment for execution of various user-level daemons 314 executing in user space 306. Daemons 314 are user-level processes that may run network management software, execute routing protocols to communicate with peer routing devices, execute configuration commands received from an administrator, maintain and update one or more routing tables, and/or create one or more forwarding tables for installation to forwarding components 324, among other functions. In this example, daemons 314 include command-line interface daemon 332 ("CLI 332"), routing protocol daemon 334 ("RPD 334"), and Simple Network Management Protocol daemon 336 ("SNMP 336"). In this respect, control plane 302 may provide routing plane, service plane, and management plane functionality for a network device (e.g., network device 200 of FIG. 2). Various instances of routing component 318 may include additional daemons 314 not shown in FIG. 3 that perform other control, management, or service plane functionality and/or drive and otherwise manage forwarding plane functionality for network device 200.

Daemons 314 operate over and interact with kernel 343, which provides a run-time operating environment for user-level processes. Kernel 343 may comprise, for example, a UNIX operating system derivative such as Linux or Berkeley Software Distribution (BSD). Kernel 343 offers libraries and drivers by which daemons 314 may interact with the underlying system. Forwarding component interface 316 ("interface 316") of kernel 343 comprises a kernel-level library by which daemons 314 and other user-level processes or user-level libraries may interact with programming interface 364 of forwarding component 324A. Interface 316 may include, for example, a sockets library for communicating with forwarding component 324A over dedicated network links.

Hardware environment 350 of routing component 318 comprises microprocessor 352 that executes program instructions loaded into a main memory 353 from storage (also not shown in FIG. 3) in order to execute the software stack, including both kernel 343 and user space 306, of routing component 318. Microprocessor 352 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 334 executes one or more interior and/or exterior routing protocols to exchange routing information with other network devices (e.g., in packet data network 14 of FIG. 1) and store received routing information in routing information base 345 ("RIB 345"). For example, RPD 334 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). RPD 334 may additionally, or alternatively, execute User Datagram Protocol (UDP) and/or Internet Protocol (IP) to send and receive data for various system resources, such as physical interfaces. RPD 334 may also execute one or more mobile network protocols. For example, RPD 334 may execute mobile network protocols such as GPRS Tunneling Protocol (GTP), S1 Application Protocol (S1AP), Packet Forwarding Control Protocol (PFCP), and/or any other 3GPP protocols.

RIB 345 may include information defining a topology of a network, including one or more routing tables and/or link-state databases. RPD 334 resolves the topology defined by routing information in RIB 345 to select or determine one or more active routes through the network and then installs these routes to forwarding information base 328. Typically, RPD 334 generates FIB 328 in the form of a radix or other lookup tree to map packet information (e.g., header information having destination information and/or a label stack) to next hops and ultimately to interface ports of interface cards associated with respective forwarding components 324. Kernel 343 may synchronize FIB 328 of routing component 318 with forwarding information of forwarding component 324A.

Command line interface daemon 332 ("CLI 332") provides a shell by which an administrator or other management entity may modify the configuration of network device 200 using text-based commands. SNMP 336 comprises an SNMP agent that receives SNMP commands from a management entity to set and retrieve configuration and management information for network device 200. Using CLI 332 and SNMP 336, for example, management entities may enable/disable and configure services, manage classifications and class of service for packet flows, install routes, enable/disable and configure rate limiters, configure traffic bearers for mobile networks, and configure interfaces, for example. RPD 334, CLI 332, and SNMP 336 in this example configure forwarding plane 304 via interface 316 to implement configured services, and/or add/modify/delete routes. Interface 316 allows daemons 314 to drive the installation and configuration of packet processing path 372 (referred to herein as "forwarding path 372") of forwarding component 324A. In particular, interface 316 includes an application programming interface (API) by which daemons 314 may map packet flows to fabric interfaces for forwarding.

Forwarding component 324A, in combination with other forwarding components 324 of network device 200, implements forwarding plane 304 (also known as a "data plane") functionality to handle packet processing from ingress interfaces on which packets are received to egress interfaces to which packets are sent. Forwarding plane 304 determines data packet forwarding through network device 200, applies services, rate limits packet flows, filters packets, and otherwise processes the packets using service objects and lookup data installed by control plane 302 to forwarding plane 304. Although FIG. 3 illustrates only forwarding component 324A in detail, each of forwarding components 324 of network device 200 comprises similar modules that perform substantially similar functionality.

Forwarding components 324 may include one or more packet processors, e.g., packet processor 368. Packet processor 368 identifies packet properties and performs actions bound to the properties. Packet processor 368 may include, e.g., Application-specific integrated circuit based packet processors ("ASICs") or other types of packet processors that process network packets by performing a series of operations on each packet over respective internal packet forwarding paths as the packets traverse the internal architecture of the network device. Packet processor 368 includes forwarding path elements 374 that, in general, when executed, examine the contents of each packet (or another packet property, e.g., inbound interface) and on that basis make forwarding decisions, apply filters, and/or perform accounting, management, traffic analysis, and load balancing, for example. In one example, packet processor 368 arranges forwarding path elements as next hop data that can be chained together as a series of "next hops" along an internal packet forwarding path, e.g., forwarding path 372, for the packet processor 368. The result of packet processing determines the manner in which a packet is forwarded or otherwise processed by packet processor 368 of forwarding component 324A from the packet's inbound interface to an outbound interface. Packet processor 268 may represent one or more hardware chips.

In the example of FIG. 3, packet processor 368 includes a key engine 370 that executes microcode (or "microinstructions") to control and apply fixed hardware components of packet processor 368 to process packet "keys." A packet key includes packet fields and other parameters that determine a flow of packet processing for the packet along a processing path, such as paths 373. Key engine 370 includes key buffer to store packet field data for corresponding packets that the key engine is currently processing. A key buffer may also provide limited writable memory to which elements of the processing path may write to pass messages accessible by future elements. Some instances of packet processors 368 may include a plurality of key engines each having an associated key buffer.

Forwarding path 372 of packet processor 368 comprises programmable, executable microcode and fixed hardware components that determine the packet processing actions and other operations performed by key engine 370. Forwarding component 324A may store executable instructions of forwarding path 372 in computer-readable storage media, such as random access memory (RAM) or static random access memory (SRAM). While illustrated within packet processor 368, in some examples executable instructions of forwarding path 372 may be stored in memory external to packet processor 368 in forwarding component 324A.

In some aspects, forwarding path 372 includes a next hop data structure to initiate processing. At the end of each processing step by key engine 370, the result is a next hop that may specify additional processing or the termination of processing, for instance. In addition, next hops may specify one or more functions to be executed by key engine 370 and/or one or more hardware elements to be applied (e.g., policers). Forwarding path elements 374 may include a table or other data structure that includes one or more logical interfaces (e.g., interface to a forwarding path).

Internal forwarding paths of the network device may include combinations of respective forwarding paths of multiple different packet processors. In other words, forwarding path 372 of packet processor 368 may include only a part of the overall internal forwarding path of the network device.

Forwarding component microprocessor 360 ("microprocessor 360") manages packet processor 368 and executes programming interface 364 to provide an interface for/to routing component 318. Programming interface 364 may comprise one or more user- or kernel-level libraries, programs, toolkits, application programming interfaces (APIs) and may communicate control and data messages to forwarding components 324 via internal communication link (e.g., communication link 230 in FIG. 2) using sockets, for example. Microprocessor 360 may execute a microkernel 362 to provide an operating environment for interfaces. Programming interface 364 receives messages from routing component 318 directing packet forwarding component 324A to configure forwarding elements 374.

Queues 380 may represent hardware queues. Forwarding component 324A may include a scheduler 376 to provide packet scheduling using queues 380. For example, scheduler 376 may schedule the order in which incoming packets from packet data network 14 are serviced and forwarded to mobile devices 19. Scheduler 376 may include packet scheduler nodes (also referred to herein as "schedulers" or "shaper" in that the node shapes the outbound traffic by scheduling packets) that may in some cases correspond to the networks and network devices of a radio access network (e.g., RAN 25 of FIG. 1) and the subscribers. Scheduler 376 may define properties of queues 380, such as an amount of interface bandwidth assigned to the queue, size of the memory buffer allocated for storing packets, the priority of the queue, and profiles (e.g., random early detection (RED) drop profiles) associated with the queue for packet transmission. As one example, when the rate of traffic exceeds the bandwidth on an interface or the bandwidth set for the traffic, incoming packets are stored in queues 380. Scheduler 376 may facilitate controlled sharing of network bandwidth for forwarding the packets from queues 380 towards subscribers. To control the flow of traffic, scheduler 376 may define a "shaping rate," which is a rate of packet transmission. For example, scheduler 376 may define a shaping rate by setting a maximum bandwidth or a maximum percentage of bandwidth for a queue and/or node to transmit data.

In accordance with the techniques described in this disclosure, routing component 318 may include a buffering module 346 to control buffering by forwarding components 324. For example, network device 200 may set aside one or more of queues 380 to buffer downlink data traffic destined for the mobile device (referred to herein as "buffering queues 382"). To configure buffering queues 382 to buffer data traffic, for example, an administrator may use CLI 332 to disable scheduling (e.g., by applying backpressure or setting NULL scheduling priority) for buffering queues 382. In some examples, buffering module 346 may cause scheduler to enable scheduling for buffering queues 382, such as in response to determining a data path between network device 200 and base station 24 is available.

Buffering module 346 may determine whether a data path (e.g., data path 27 of traffic bearer 26 of FIG. 1) that connects base station 24 to network device 200 is unavailable or will be unavailable. For instance, network device 200 may receive an indication that mobile device 19A is entering power saving or idle mode, which causes data path 27 of traffic bearer 26 to be released or otherwise unavailable. In response, buffering module 346 may cause forwarding component 324A to allocate one of buffering queues 382 in forwarding component 324A to buffer data traffic for data path 27. For example, buffering module 346 may allocate hardware queue 381 via interface 316 and programming interface 364 to buffer data traffic destined for mobile device 19A.

In some examples, the allocated hardware queue 381 is assigned to data path 27 when network device 200 receives an initial data traffic from packet data network 14 (via an IFC of forwarding component 324A) that is destined for output on traffic bearer 26. In some examples, an administrator may statically assign allocated hardware queue 381 to data path 27. In some examples in which multiple data bearers are established between network device 200 and different base stations, network device 200 may allocate a particular hardware queue from buffering queues 382 to a particular data bearer in response to determining the particular data bearer is not available. Network device 200 may continue to forward data traffic on data bearers that are available.

In response to receiving data traffic, key engine 370 of network device 200 may determine that the data traffic is destined for output to mobile device 19A on traffic bearer 26, and stores the data traffic in allocated hardware queue 381. In some examples, network device 200 may determine that a GTP tunnel IP address and TEID associated with data path 27 are not available and store the data traffic in allocated hardware queue 381.

When the data path (e.g., data path 27) becomes available for packet transmission, buffering module 346 may cause network device 200 to release the data traffic stored in allocated hardware queues 381 and output the data traffic to base station 24. For example, network device 200 may receive a control message indicating mobile device 19A is no longer in idle or power saving mode. In another example, network device 200 may establish data path 27. In any event, buffering module 346 may instruct forwarding component 324A to release the data traffic buffered in allocated hardware queue 381 and output the data traffic according to forwarding path 372 to base station 24 for mobile device 19A. For example, buffering module 346 may cause scheduler 376 to enable scheduling for the allocated hardware queue 381. For instance, buffering module 346 may instruct scheduler 376 via interface 316 and programming interface 364 to remove backpressure from allocated hardware queue 381 or to set the scheduling priority of allocated hardware queue 381 to not NULL. In response to enabling scheduling for the allocated hardware queue 381, the data traffic stored in the allocated hardware queue 381 is released and forwarding component 324A forwards the data traffic to mobile device 19A based on forwarding path 372.

In this example, allocated hardware queue 381 may be mapped to a loopback interface of packet processor 368 such that the data traffic released from allocated hardware queue 381 arrives at the loopback interface of packet processor 368 to be processed in accordance with forwarding path 372 and forwarded to base station 24 for mobile device 19A (e.g., by encapsulating the packet with a GTP-U tunnel header). In some examples, scheduler 376 may define the shaping rate for transmission of the packets stored in allocated queues 382.

Figure 4:
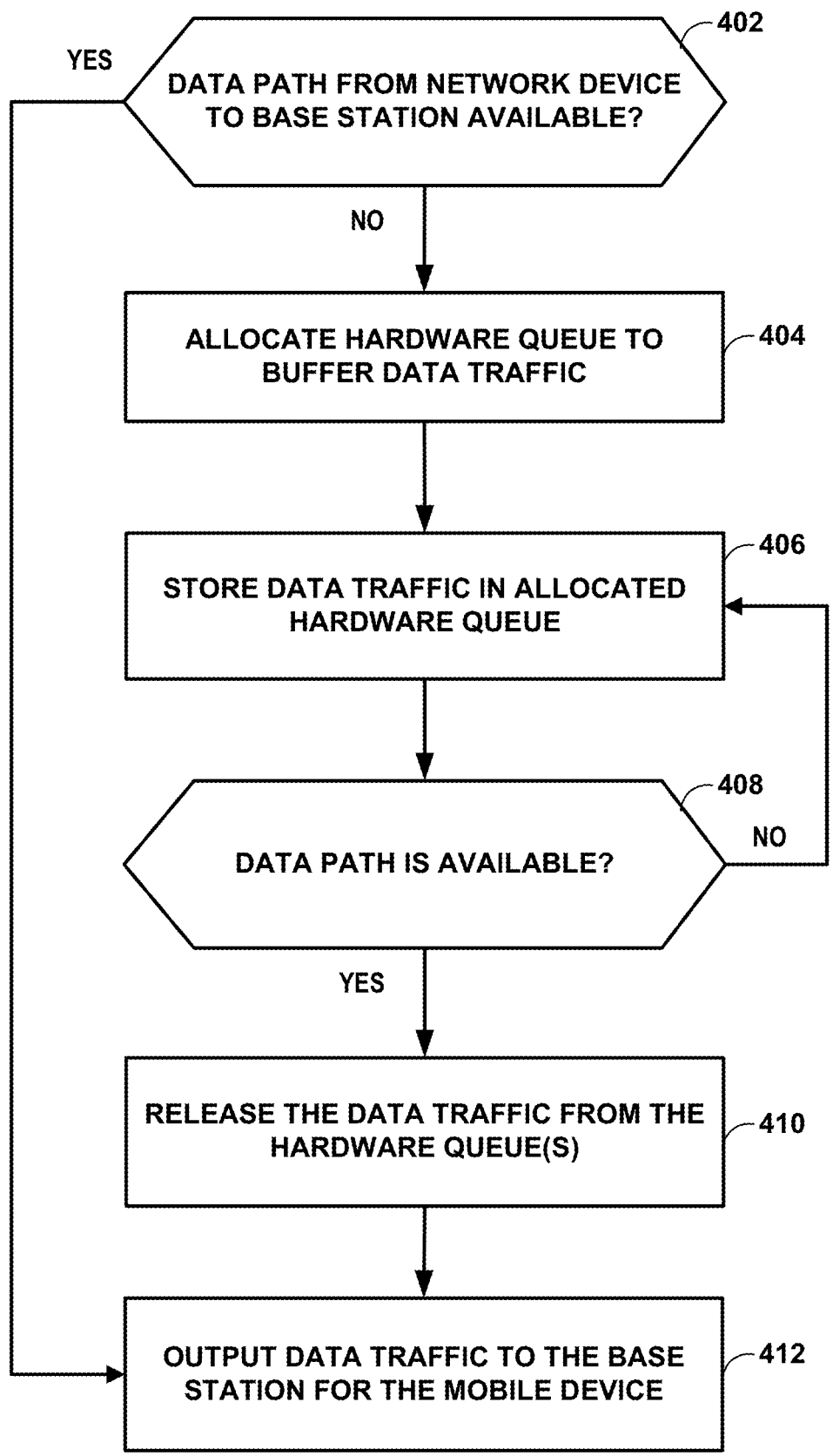
FIG. 4 is a flowchart illustrating an example operation by a network device that provides buffering of data traffic destined for a mobile device when a data path to a base station for the mobile device is not available, in accordance with the techniques described in this disclosure.

FIG. 4 is a flowchart illustrating an example operation of a network device that provides buffering of data traffic destined for a mobile device when a data path to a base station for the mobile device is not available, in accordance with the techniques described in this disclosure. The buffering techniques of this disclosure are described for purposes of illustration with respect to network device 10 of FIG. 1, and network device 200 of FIGS. 2-3. The techniques however should not be limited to this example and may be performed by any network device capable of receiving and forwarding packets from a mobile network to an external packet data network.

In the example of FIG. 4, network device 10 may determine whether a data path from network device 10 to base station 24 is available (402). For example, network device 10 may determine that data path 27 of traffic bearer 26 is unavailable (or will become unavailable) by receiving an indication that mobile device 19A is entering power saving or idle mode.

If the data path is available ("YES") of step 402), network device 10 forwards data traffic to base station 24 for mobile device 19A. If network device 10 determines that data path 27 of traffic bearer 26 is unavailable ("NO" of step 402), network device 10 may allocate a hardware queue of a packet processor of network device 10 to the data path (404). For example, network device 10 may dynamically assign data path 27 of traffic bearer 26 to the allocated hardware queue 11 in response to receiving an initial packet for output to mobile device 19A on traffic bearer 26. In some examples, data path 27 of traffic bearer 26 is statically assigned to allocated hardware queue 11. In some examples, network device 10 may disable scheduling for allocated hardware queue 11 to enable the hardware queue to buffer data traffic for the data path. For example, network device 10 may apply backpressure or setting NULL scheduling priority for the allocated hardware queue 11.

Network device 10 receives data traffic that is destined for output to mobile device 19A on traffic bearer 26 and stores the data traffic in the allocated hardware queue 11 (406). For example, network device 10 may receive a packet from packet data network 14 that has a destination address of mobile device 19A and stores the packet in the allocated hardware queue 11.

Network device 10 determines whether the data path becomes available (408). In some examples, network device 10 may determine that data path 27 of traffic bearer 26 is available by receiving an indication that mobile device 19A is no longer in idle or power saving mode. In some examples, network device 10 may determine that data path 27 of traffic bearer 26 is available by establishing data path 27 between network device 10 and base station 24. If network device 10 determines that the data path is not available ("NO" of step 408), network device 10 continues to buffer data traffic that is destined for output to mobile device 19A on traffic bearer 26. If network device 10 determines that the data path is available ("YES" of step 408), network device 10 may release the buffered data traffic in allocated hardware queue 11 (410) and output the data traffic to base station 24 along the data path toward the destination mobile device (412). For example, network device 10 may enable scheduling for allocated hardware queue 11, which causes the allocated hardware queue 11 to release the buffered data traffic.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
in response to determining, by a network device of a mobile network, a data path from the network device to a base station for a mobile device is not available, allocating a hardware queue of a packet processor of the network device to the data path, wherein the allocated hardware queue is configured to disable packet scheduling;
storing, by the network device, data traffic for the mobile device to the allocated hardware queue; and
in response to determining, by the network device, the data path is available, outputting the data traffic from the allocated hardware queue to the base station along the data path.

2. The method of claim 1, wherein determining the data path is available comprises receiving an indication that the mobile device is not in idle or power saving mode.

3. The method of claim 1, wherein determining the data path is available comprises establishing a data bearer between the network device and the base station, wherein the data path includes the data bearer.

4. The method of claim 1, wherein determining the data path is not available comprises receiving an indication that the mobile device is in idle or power saving mode.

5. The method of claim 1, wherein the allocated hardware queue is configured with a NULL scheduling priority to disable packet scheduling.

6. The method of claim 1, wherein the allocated hardware queue is configured to have backpressure applied to disable packet scheduling.

7. The method of claim 1, wherein the allocated hardware queue is one of a plurality of hardware queues allocated for use as buffer queues and mapped to a loopback address of the packet processor of the network device.

8. The method of claim 1, wherein allocating the hardware queue to the data path further comprises:
allocating the hardware queue to the data path in response to receiving an initial packet for output to the mobile device on the data path.

9. A network device comprising:
a control unit comprising processing circuitry configured to allocate, in response to a determination that a data path from the network device to a base station for a mobile device is not available, a hardware queue of a packet processor of the network device to the data path, wherein the allocated hardware queue is configured to disable packet scheduling; and
a forwarding component with access to the hardware queue, wherein the forwarding component comprises processing circuitry configured to store data traffic for the mobile device to the allocated hardware queue,
wherein the control unit is configured to, in response a determination that the data path is available, configure the forwarding component to output the data traffic from the allocated hardware queue to the base station along the data path.

10. The network device of claim 9, wherein to determine that the data path is available, the control unit is configured to receive an indication that the mobile device not in idle mode.

11. The network device of claim 9, wherein to determine that the data path is available, the control unit is configured to establish a data bearer between the network device and the base station, wherein the data path includes the data bearer.

12. The network device of claim 9, wherein to determine that the data path is not available, the control unit is configured to receive an indication that the mobile device is in idle or power saving mode.

13. The network device of claim 9, wherein the network device comprises a serving gateway (SGW).

14. The network device of claim 9, wherein the network device comprises a user plane function (UPF).

15. The network device of claim 9, wherein the allocated hardware queue is configured with a NULL scheduling priority to disable packet scheduling.

16. The network device of claim 9, wherein the allocated hardware queue is configured to have backpressure applied to disable packet scheduling.

17. The network device of claim 9, wherein the allocated hardware queue is one of a plurality of hardware queues allocated for use as buffer queues and configured with a loopback address of the packet processor of the network device.

18. A non-transitory computer-readable storage medium comprising instructions, that when executed by processing circuitry of a network device of a mobile network, cause the processing circuitry to:
allocate, in response to a determination that a data path from the network device to a base station for a mobile device is not available, a hardware queue of a packet processor of the network device to the data path, wherein the allocated hardware queue is one of a plurality of hardware queues allocated for use as buffer queues and mapped to a loopback address of the packet processor of the network device;
store data traffic for the mobile device to the allocated hardware queue; and
output, in response to a determination that the data path is available, the data traffic from the allocated hardware queue to the base station along the data path.

* * * * *